United States Patent [19]

Johnson

[11] Patent Number: 4,470,429
[45] Date of Patent: Sep. 11, 1984

[54] THREE-WAY VALVE

[75] Inventor: Bruce R. Johnson, Petaluma, Calif.

[73] Assignee: Jandy Industries, Inc., San Rafael, Calif.

[21] Appl. No.: 375,387

[22] Filed: May 6, 1982

[51] Int. Cl.³ .................. F16K 11/085; F16K 27/12
[52] U.S. Cl. ............................... 137/270; 137/556; 137/625.41; 137/625.46; 251/286
[58] Field of Search .......... 137/625.46, 876, 625.47, 137/556.6, 556.3, 556, 555, 625.45, 625.11, 270.5, 270, 625.41; 251/286, 301, 288, 287, 285; 166/277

[56] References Cited

U.S. PATENT DOCUMENTS

| 825,706 | 7/1906 | Dyblie | 137/556 |
| 1,166,571 | 7/1916 | Bard | 137/625.45 |
| 3,834,537 | 9/1974 | Brett | 137/625.46 |

Primary Examiner—Martin P. Schwadron
Assistant Examiner—John S. Starsiak, Jr.
Attorney, Agent, or Firm—Melvin R. Stidham

[57] ABSTRACT

A three-way rotary plug valve comprising upper and lower radial arms carried on top and bottom shafts and supporting an integral arcuate closure member between them. The upper shaft extends through a bearing in the top closure and carries a sector position indicator having an arcuate outer surface which overlies and is coextensive with the arcuate closure sealing surface so that the precise position of the closure is apparent at all times. Marks on the top cover depict the locations of the flow passages and cooperating stop means on the cover and the position indicator prevent complete blockage of the inlet passageway from the pump.

4 Claims, 4 Drawing Figures

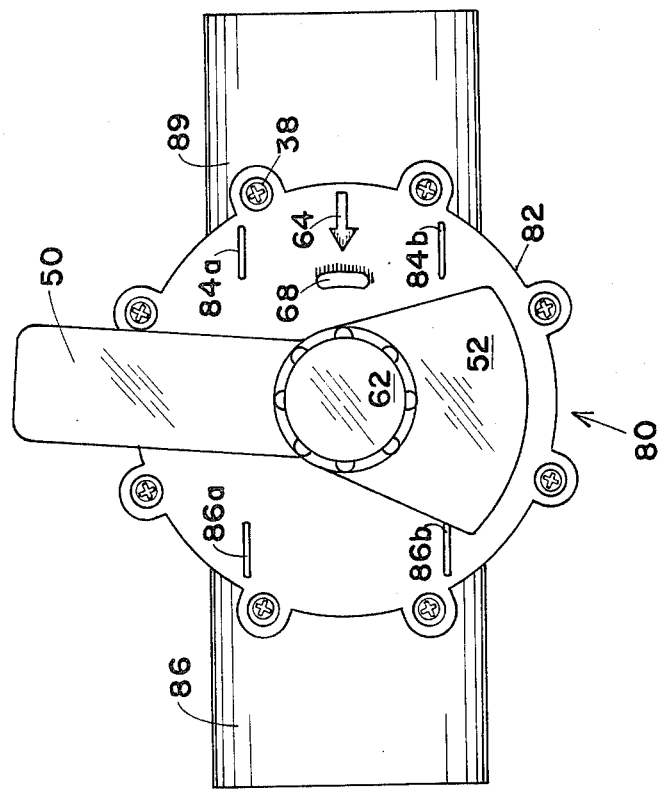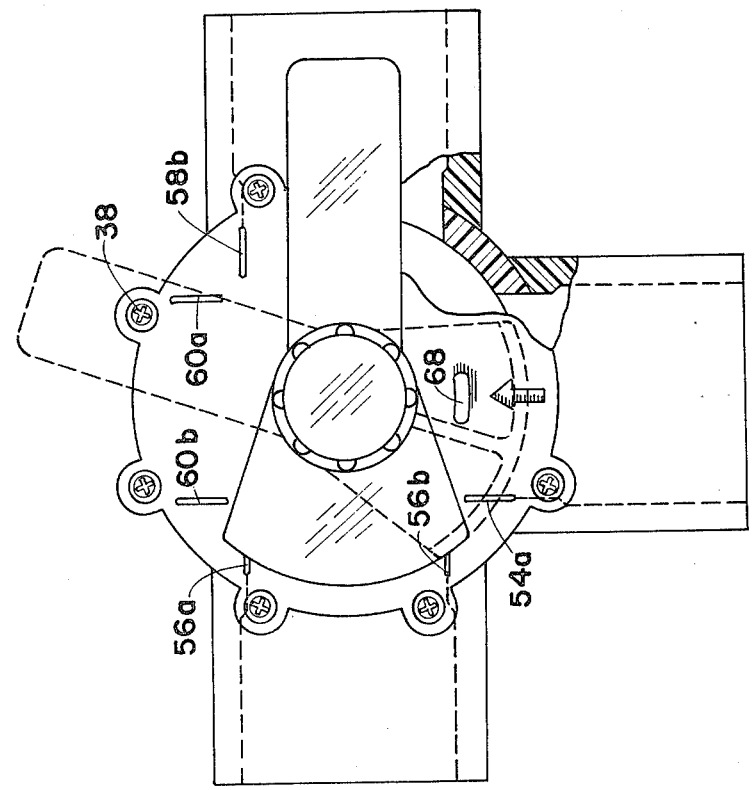

THREE-WAY VALVE

BACKGROUND OF THE INVENTION

Many devices used in the care and treatment of swimming pools provide for a high velocity jet of water to stir dirt, leaves and other foreign matter from the pool bottom and walls and into suspension for removal by the pool circulation system, or to create a low pressure zone for suction of same from the bottom and walls. Since pumps are employed in the regular circulation of water from the pool through heating and/or filtering media and back to the pool again, it is highly desirable to use the available circulation pump for the pool treating equipment, as well as for other water circulation systems. In such event, it is necessary to have suitable valving means to direct the pump discharge selectively through either the normal circulation system or the auxilary pool treating systems. It is also necessary, because of the generally high flow capacity requirements for such auxilary systems, that the valve device provide high flow capacity in both the circulation and pool-treating modes. It is further highly desirable that the three-way valve be adapted so that any one of the three hubs may be connected to the suction or discharge line connected to a pump, with the other two being connected to circulation and cleaning system delivery, thus offering flexibility in plumping arrangements.

OBJECTS OF THE INVENTION

It is an object of this invention to provide a three-way valve with three flow passageways, any one of which may be connected to the pump discharge or suction, with the other two passageways serving for fluid circulation.

It is a further object of this invention to provide a three-way valve having maximum flow capacity in any setting.

It is a further object of this invention to provide a three-way valve with a valve closure member operable to regulate the relative flow rates through two delivery passageways.

It is a further object of this invention to provide a three-way valve operable to restrict or close off flow through either of two delivery passageways.

It is a further object of this invention to provide a three-way valve with a position indicator that provides a visual indication of the precise position of a valve closure member relative to flow passageways.

It is a further object of this invention to provide a three-way valve with a closure member, which is adapted to close off partially or completely a selected flow passageway, together with means conditioned to lock said closure member in a selected position.

It is a further object of this invention to provide a three-way valve with means for preventing complete closure of the pump connection passageway.

Other objects and advantages of this invention will become apparent from the description to follow, particularly when read in conjunction with the accompanying drawings.

SUMMARY OF THE INVENTION

In carrying out this invention, there is provided a generally cylindrical valve body with laterally extending hub passageways, preferably in a Tee pattern. A valve closure having a cylindrical outer surface of an arcuate width to block a flow passageway is carried on relatively thin radial arms which, in turn, are carried on stub shafts rotatable in the bottom of the valve body and a removable top closure. An operating lever is provided to turn the closure, and extending from the lever arm is sector-configurated position indicator having an arcuate outer edge that overlies and is of the arcuate dimension as the arcuate valve closure sealing surface, so that the precise position of the valve closure will be visually apparent. Pairs of indicia on the top closure are aligned with the flow passageways so that the position of the closure relative thereto is apparent. When the top closure is placed, an indicator is aligned with the inlet passageway, and engagable stop means on the top closure and the valve position indicator prevent full blockage of the inlet passageway. Means are also provided to secure the operating lever arm in any selected position.

BRIEF DESCRIPTION OF THE DRAWING

In the drawings:

FIG. 3 is a top view, partially broken away, of the valve of FIG. 1; and

FIG. 4 is a top view of a two-way valve embodying features of this invention.

DESCRIPTION OF PREFERRED EMBODIMENTS

Figure 1:
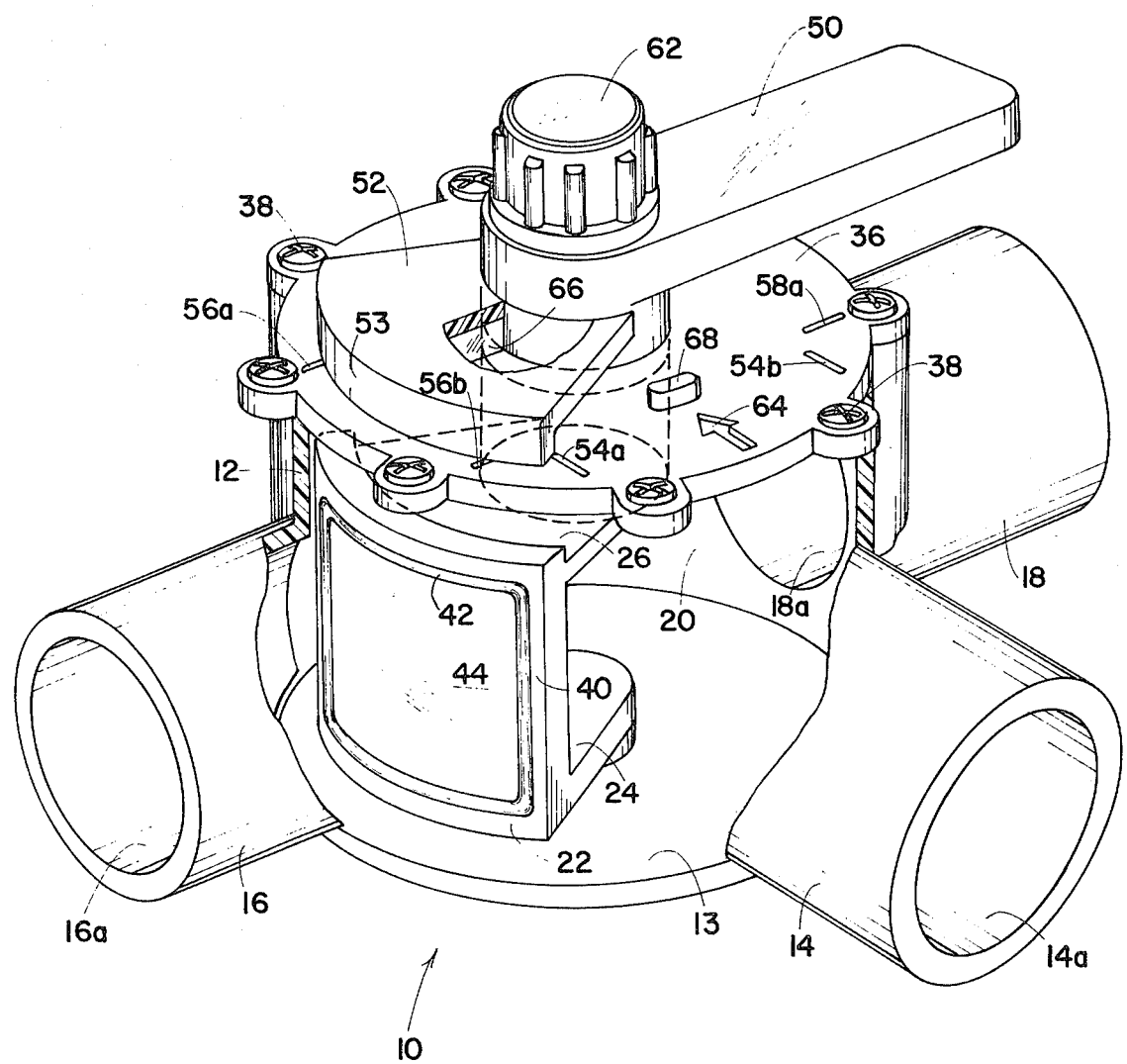
FIG. 1 is a view in perspective, partially broken away, showing the three-way valve of this invention.
Figure 2:
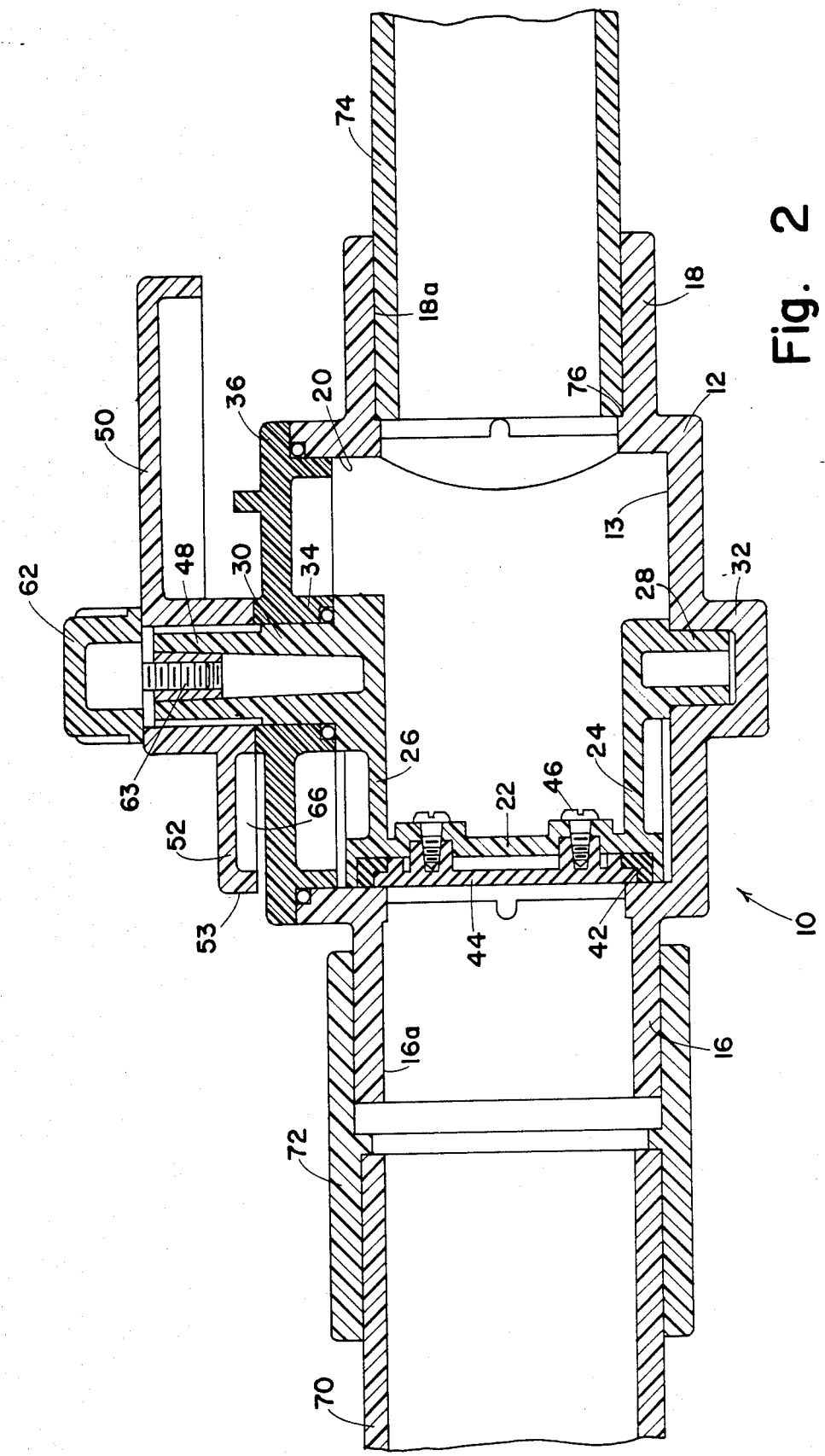
FIG. 2 is a vertical section view taken through the valve.

The Embodiment of FIGS. 1 to 3

Referring now to FIGS. 1 and 2 with greater particularity, the three-way valve 10 of this invention includes a generally cylindrical receptacle or body 12, including an integral bottom 13. Extending radially from the body 12 are three hubs 14, 16 and 18 having flow passageways 14a, 16a and 18a therethrough extending through the cylindrical interior surface 20 of the valve body 12, which forms sealing surfaces around the passageways 14a, 16a and 18a.

A valve closure plug 22 is carried on radial arms 24 and 26 which, in turn, carry lower and upper stub shafts 28 and 30. The lower shaft 28 is rotatably carried in a bearing receptacle 32 integrally formed in the bottom 13 of the housing receptacle 12, and the top shaft 30 is rotatably carried in a bearing 34 integrally formed in a top closure 36, which is removably secured to the top of the housing 12, as by means of screws 38 (FIG. 3).

As shown most clearly in FIG. 1, the radial, plug-carrying arms 24 and 26 may be in the configuration of sectors terminating in a generally cylindrical valve carrier or surface 40 in which is carried a resilient seal member 42. The seal member 42 is secured in place by an arcuate retainer plate 44, which is secured to the closure plug 22 by means of screws 46 (FIG. 2). Because the closure plug 22 is relatively thin in radial dimension, and the radial arms 24 and 26 are relatively thin in axial dimension, there is a free area between them of considerable cross-section for maximum flow capacity in any position of the plug 22.

Splined onto an upper extension 48 of the top shaft 30 is a lever arm 50 by means of which the closure member 22 can be moved to a selected angular position, as will hereinafter be described. Integral with, and diametrically opposite the lever arm 50 is a sector-configurated position indicator 52, with an outer arcuate surface 53 that overlies and is coextensive with, the sealing surface 40 of the closure member 22.

Visually evident on the valve top closure 36 is a series of markers or indicia 54a and 54b, 56a and 56b, 58a and 58b. These markers define the widths of the flow passages 14a, 16a and 18a, so that when the lever arm 50 is turned to align the sector position indicator 52, 53 with respect to a pair of markers, e.g. 56a and 56b, the position indicator will show the precise position of valve closure sealing surface 40 with respect to the associated flow passage 16a. In any selected position, a knurled knob 62 may be threaded down into an internally threaded insert sleeve 63, which is press fit, bonded or otherwise secured in the hollow upper stem extension 48, to lock the lever arm 50 in its selected position.

In initial installation of the valve 10, any one of the hubs 14, 16, or 18 may be connected to the pump suction or discharge line (not shown), and the remaining hubs are connected to delivery lines for normal pump circulation and for operating auxilary pool treating or cleaning equipment (not shown). Then, the valve top closure 36 is placed so that an arrow 64 thereon is in alignment with the particular hub, e.g. hub 14, which was selected for connection to the pump. Since the top closure 36 and valve body 12 are of circular configuration, with the screws 38 located on a circle, the top closure can be placed to fit in almost any angular position. With the arrow 64 so positioned in alignment with the pump connector hub 14, the markers 56a and 56b will automatically be aligned with the one delivery hub 16 and the markers 58a and 58b will be aligned with the other circulation system hub 18.

While the valve closure seal ring 42 encompasses a large enough area to completely surround and close off a flow passage 16a or 18a, it is necessary to prevent full closure of the pump connection hub 14 to prevent pump damage. Accordingly, cooperating stop members 66 and 68 are provided on the valve position indicator 52 and the top closure plate 36, respectively to prevent full closure of the pump connection flow passageway 14a.

As an additional feature, the hubs 16a and 18a are formed so that a standard two inch pipe 70 may be aligned with, and connected to, a hub as by means of a coupling sleeve 72, or a standard 1½ inch pipe 74 may be received in either hub to nest against a shoulder 76 therein and there secured in place as, by a suitable epoxy bond.

The Embodiment of FIG. 4

In FIG. 4, a two-way valve 50 is illustrated in open position, with the valve position indicator 52 out of alignment with the delivery flow passage markers 86a and 86b so that flow from the pump discharge hub 84, as indicated by the arrow 64, is unimpeded. In this embodiment, the valve lever 50 may be turned from full open position shown to full or partial alignment with the markers 86a, 86b to close the valve 80 or to control the rate flow therethrough.

While this invention has been described in conjunction with preferred embodiments thereof, it obvious that modifications and changes therein may be made by those skilled in the art to which it pertains without departing from the spirit and scope of this invention, as defined by the claims appended hereto.

What is claimed as invention is:

1. A rotary three-way plug valve comprising:
   a generally cylindrical valve body;
   at least three hubs extending radially from said body and having flow passageways therethrough opening into said valve body;
   a cylindrical inner surface in said body forming sealing surfaces around said flow passageways;
   each of said hubs being adapted for connection to a pump;
   a valve closure member rotatable in said body and having an outer arcuate surface engageable with said sealing surfaces and being of sufficient arcuate length to span said passageways;
   a generally circular top closure;
   a top shaft on said valve closure rotatable in and extending through said top closure;
   an operating lever secured to said top shaft for rotation thereof;
   first and second engagable stop means on said top shaft and said top closure, respectively, to prevent full closure of a flow passageway aligned with said second stop means; and
   symmetrical mounting means for said top closure so that same can be secured in a selected angular position on said body with said second stop means aligned with that one of said hubs connected to a pump.

2. The plug valve defined by claim 1 wherein said valve closure member comprises:
   a stub shaft rotatably received in the bottom of said valve body;
   top and bottom arms carried on said top and stub shafts, respectively; and
   a relatively thin valve carrier supported at top and bottom on said arms; said outer arcuate surface being supported on said carrier.

3. The plug valve defined by claim 1 wherein:
   each of said hubs has an outer diameter substantially equal to one standard outer pipe diameter and an inner diameter equal to another standard outer pipe diameter; and including:
   an internal shoulder in each said hub to be engaged by the end of said another standard pipe received therein.

4. The rotary three-way plug valve defined by claim 1 including:
   lock means on said top shaft operable to secure said valve closure member in a selected angular position in said valve body.

* * * * *